3,372,160
CYANINE DYES
Geoffrey Ernest Ficken, Ilford, Essex, England, assignor to Ilford Limited, Ilford, England, a British company
No Drawing. Filed May 6, 1964, Ser. No. 365,521
Claims priority, application Great Britain, May 17, 1963, 19,755/63
8 Claims. (Cl. 260—240.1)

This invention relates to cyanine dyes and to the use thereof, particularly as sensitisers for silver halide photographic emulsions.

In British patent specification No. 544,645 there are described cyanine sensitising dyes which contain a pyrazolone or isoxazolone substituent. It has now been discovered that, by substitution of a sulphoalkyl group for an alkyl group in the 2-position of the pyrazolone or isoxazolone rings, an unexpected and valuable increase in the sensitising properties of these cyanine dyes is obtained.

According to the present invention there are provided cyanine dyes of the general Formula I:

$$\underset{R_1}{\overset{\ulcorner\text{------}D_1\text{------}\urcorner}{N^+=(CH-CH)_{n_1}=}}\overset{R_4}{\underset{|}{C}}-\overset{}{\underset{}{C}}=C-CH=(CH-CH)_m=\overset{}{\underset{}{C}}-(CH=CH)_{n_2}-\overset{\ulcorner\text{------}D_2\text{------}\urcorner}{\underset{R}{N}}$$

$$O=C\diagdown\diagup C-R_3$$
$$A\text{------}N-R_6SO_3^-$$

I wherein:

$R_1$ and $R_2$ are the same or different and are alkyl groups,
$R_3$ is hydrogen or an alkyl, aryl, aralkyl or heterocyclic group,
$R_4$ is hydrogen or an alkyl group,
$R_6$ is a straight or branched chain saturated divalent alkylene group,
A is oxygen or a grouping —$NR_5$ where $R_5$ is hydrogen or an alkyl, aryl, aralkyl or heterocyclic group,
$D_1$ and $D_2$ are the same or different five-membered or six-membered heterocyclic nitrogen nuclei, and
$n_1$, $n_2$ and $m$ are the same or different and are each nought or one.

It will be observed that the dyes are formulated in the zwitterionic form produced by loss of an acid group at the nitrogen shown as positively charged and a hydrogen atom from the sulphonic residue.

Where in the foregoing Formula I $R_1$, $R_2$, $R_3$, $R_4$ or $R_5$ is an alkyl group, these are preferably lower alkyl groups, e.g. methyl, ethyl, propyl or butyl, but may be higher alkyl groups. Where $R_3$ or $R_5$ are aralkyl groups these may be, for example, benzyl or naphthylmethyl. Where $R_3$ or $R_5$ are aryl groups these may be, for example, phenyl or naphthyl groups and such groups may themselves carry substituents, e.g. alkyl, amino, hydroxy, alkoxy or oxyalkyl groups or halogen atoms. Where $R_3$ or $R_5$ is a heterocyclic group it may be, for example, a furyl or a pyridyl group.

$R_6$ may be a straight or branched alkylene chain containing preferably two to six carbon atoms in the chain.

$D_1$ and $D_2$ may each be the residue of a heterocyclic nucleus of any of the types commonly employed in the production of cyanine dyes, e.g. a substituted or unsubstituted thiazole, thiazoline, oxazole, oxazoline, selenazole, selenazoline, pyridine, quinoline, indolenine, diazine (e.g. pyrimidine), thiadiazole, quinazoline, iminazoline or pyrazolenine nucleus including the corresponding substituted or unsubstituted polycyclic nuclei such as the benzthiazole, naphthothiazole, benzoxazole and naphthoxazole nuclei.

According to a further feature of this invention the said cyanine dyes are prepared by one of the following procedures—

(a) By reaction of a compound of the general Formula II:

$$\overset{\ulcorner\text{------}D_1\text{------}\urcorner}{N^+=(CH-CH)_{n_1}=}\overset{R_4}{\underset{|}{C}}-\overset{}{\underset{}{C}}=C-CH_3$$

$$O=C\diagdown\diagup C-R_3$$
$$A\text{------}N-R_6SO_3^-$$

II with a compound of the general formula:

$$Q-\overset{\ulcorner\text{------}D_2\text{------}\urcorner}{\underset{R_2}{C}}=(CH-CH)_{n_2}=\overset{}{\underset{X}{N}}$$

III where Q is an alkylthio, alkylthiovinyl or acetanilidovinyl group.

The intermediate of Formula II required for this process may be obtained by reacting a compound of Formula IV:

$$\overset{\ulcorner\text{------}D_1\text{------}\urcorner}{N-(CH=CH)_{n_1}}-\overset{R_4}{\underset{|}{C}}=\overset{}{\underset{}{C}}-C-CH_3$$

$$O=C\diagdown\diagup C-R_3$$
$$A\text{------}N$$

IV with an alkane-sultone of the Formula V:

$$\overset{\ulcorner\text{---}R_6\text{---}\urcorner}{O\text{------}SO_2}$$

V where $R_6$ is a saturated alkylene group containing 2 to 6 carbon atoms in the chain linking the oxygen and sulphur atoms.

(b) By fusing of a compound of general Formula IV with a compound of general Formula V and a heterocyclic thione of Formula VI:

$$S=\overset{\ulcorner\text{------}D_2\text{------}\urcorner}{\underset{R_2}{C}}-(CH=CH)_{n_2}-N$$

VI (c) By reacting a thione of Formula VI with a compound of Formula V and a compound of the Formula VII:

$$CH_3-\underset{\|}{C}-CH_3$$
$$C\overset{}{O}\diagdown\diagup-R_3$$
$$A\text{------}N$$

VI

This process leads to a symmetrical dye.

The following examples will serve to illustrate the invention. The temperatures given are in degrees centigrade.

*Example 1.*—Anhydro - bis - (3-methyl-5-phenyl-2-benzoxazole)β - (3 - methyl - 5-oxo-1-phenyl-2-3' - sulphopropyl-4-pyrazolinyl)-trimethincyanine hydroxide A mixture of 4 - isopropylidene - 3-methyl-1-phenyl-5-pyrazolone (1.1 g.), 3-methyl-5-phenyl-2-thiobenzoxazoline (4.8 g.) and 1,3-propanesultone (5.0 g.) was heated at 145° for 4 hours, pyridine (20 ml.) was added and the mixture was refluxed for 1 hour. The product was stirred with dilute aqueous ammonia and the solid was collected and washed successively with water, hot benzene and ether. After boiling out several times with methanol, the dye was obtained as red crystals, M.P. 326–327° (decomp.).

The dye extends the sensitivity of a silver iodobromide photographic emulsion to 5950 A. with a maximum at 5700 A.

*Example 2.—Anhydro - bis - (3,5,6-trimethyl-2-benzoxazole)β - (3 - methyl - 5 - oxo - 1 - phenyl-2-3'-sulphopropyl-4-pyrazolinyl)-trimethincyanine hydroxide*

A mixture of 4-isopropylidene - 3 - methyl-1-phenyl-5-pyrazolone (1.1 g.), 3,5,6-trimethyl-2-thiobenzoxazoline (3.9 g.) and 1,3-propanesultone (5.0 g.) was fused at 145° for 1½ hours, and the melt was then refluxed with pyridine (20 ml.) for 1 hour. The resulting mixture was stirred with dilute aqueous ammonia and the solid was collected, washed with water, dried and extracted (Soxhlet) with benzene until no more yellow material was removed. Crystallisation of the residue from methanol gave the dye as red crystals, M.P. 308–309° (decomp.).

The dye extends the sensitivity of a silver iodobromide photographic emulsion to 5950 A. with a maximum at 5700 A.

By the use of methods similar to those of Examples 1 and 2, the dyes of Examples 3 to 19 were prepared by fusion of a substituted 3-methyl-2-thiobenzoxazoline with a 4-isopropylidene-5-pyrazolone and 1,3-propanesultone. Details of the preparations are given in Table 1, which also lists the properties of the resulting dyes. These dyes were all of structure:

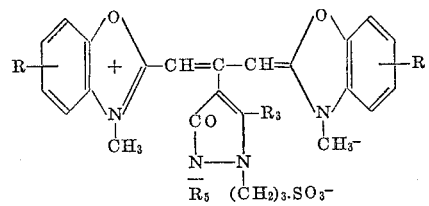

TABLE 1

| Example | Substituents R in both benzoxazole rings | $R_3$ | $R_5$ | Temperature (° C.) and time (hours) of fusion | | Solvent for crystallisation | M.P., ° C. | Sensitising, A. | |
|---|---|---|---|---|---|---|---|---|---|
| | | | | | | | | Extent | Max. |
| 3 | H | —$CH_3$ | —$C_6H_5$ | 160 | 3 | Methanol | 310–311 (decomp.) | 5,850 | 5,300 / 5,700 |
| 4 | 5—$CH_3$ | —$CH_3$ | —$C_6H_5$ | 145 | 3½ | do | 279–281 (decomp.) | 5,800 | 5,650 |
| 5 | 6—$CH_3$ | H | —$C_6H_5$ | 160 | 6 | do.[1] | 314–316 (decomp.) | 5,800 | 5,500 |
| 6 | 6—$CH_3$ | —$CH_3$ | —$C_6H_5$ | 160 | 4 | do.[1] | 317–318 (decomp.) | 5,950 | 5,650 |
| 7 | 6—$CH_3$ | —$CH_2.CH_2.CH_3$ | —$C_6H_5$ | 165 | 3 | do | 320–323 (decomp.) | 5,900 | 5,650 |
| 8 | 6—$CH_3$ | —$CH_3$ | p-tolyl | 160 | 6 | do | 289–292 (decomp.) | 5,800 | 5,600 |
| 9 | 6—$CH_3$ | —$CH_3$ | m-chlorophenyl | 160 | 4 | do | 254–257 | 5,900 | 5,650 |
| 10 | 5,6—$(CH_3)_2$ | —$CH_2.CH_2.CH_3$ | —$C_6H_5$ | 165 | 3 | do | 277–282 | 5,900 | 5,600 |
| 11 | 5,6—$(CH_3)_2$ | —$CH_3$ | p-tolyl | 160 | 6 | do | 335–336 (decomp.) | 5,950 | 5,700 |
| 12 | 5,6—$(CH_3)_2$ | —$CH_3$ | m-chlorophenyl | 160 | 4 | do | 311–314 (decomp.) | 6,000 | 5,700 |
| 13 | 5—Cl | —$CH_3$ | —$C_6H_5$ | 160 | 4 | do.[1] | 296–298 (decomp.) | 5,750 | 5,550 |
| 14 | 6—$OCH_3$ | —$CH_3$ | —$C_6H_5$ | 145 | 4 | do | 253–255 (decomp.) | 6,000 | 5,750 |
| 15 | 6—$OCH_3$ | —$CH_2.CH_2.CH_3$ | —$C_6H_5$ | 165 | 3 | do | 253–255 | 6,050 | 5,800 |
| 16 | 6—$OCH_3$ | —$CH_3$ | m-chlorophenyl | 160 | 4 | do | 258–260 | 6,050 | 5,800 |
| 17 | 6—$C_6H_5$ | —$CH_3$ | —$C_6H_5$ | 160 | 3½ | do.[1] | 270–274 (decomp.) | 6,100 | 5,700 |
| 18 | 4,5-benzo | —$CH_3$ | —$C_6H_5$ | 160 | 4 | do.[1] | 308–310 (decomp.) | 6,100 | 5,950 |
| 19 | 6,7-benzo | —$CH_3$ | —$C_6H_5$ | 140 | 4 | do.[1] | >360 | 5,800 | 5,600 |

[1] Boiled out.

In a similar manner to the above examples, a substituted 3-methyl-2-thiobenzoxazoline was fused with 4-isopropylidene-3-methyl-5-isoxazolone and 1,3-propanesultone to give the dyes of Examples 20 to 28 (Table 2). These dyes possess the structure:

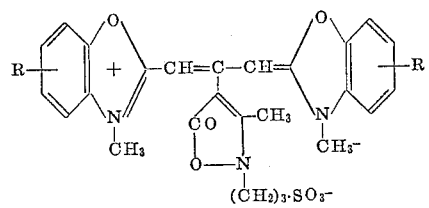

TABLE 2

| Example | Substituents R in both benzoxazole rings | Temperature (° C.) and time (hours) of fusion | | Solvent for recrystallisation | M. P., ° C. | Sensitising, A. | |
|---|---|---|---|---|---|---|---|
| | | | | | | Extent | Max. |
| 20 | H | 160 | 3 | Methanol | 257–260 | 5,850 | 5,750 |
| 21 | 6-$CH_3$ | 160 | 4 | do | 286–288 (decomp.) | 6,000 | 5,700 |
| 22 | 5,6-$(CH_3)_2$ | 160 | 3½ | do | 233–235 (decomp.) | 6,100 | 5,800 |
| 23 | 5-Cl | 160 | 4 | do.[1] | 300–303 (decomp.) | 5,750 | 5,600 |
| 24 | 6-O.$CH_3$ | 160 | 3 | do.[1] | 273–274 (decomp.) | 6,100 | 5,850 |
| 25 | 5-$C_6H_5$ | 160 | 2 | do | 260–264 (decomp.) | 6,000 | 5,700 |
| 26 | 6-$C_6H_5$ | 160 | 3 | do | 310–311 (decomp.) | 6,050 | 5,850 |
| 27 | 4,5-benzo | 160 | 4 | do | 300–302 | 6,200 | 5,950 |
| 28 | 6,7-benzo | 140 | 4 | do.[1] | 298–301 | 5,750 | 5,600 |

[1] Boiled out.

*Example 29.—Anhydro-bis-(3-methyl-2-benzothiazole)β-(3 - methyl-5-oxo-1-phenyl-2-3'-sulphopropyl-4-pyrazolinyl)-trimethincyanine hydroxide*

A mixture of 3-methyl-2-[2-(3-methyl-5-oxo-1-phenyl-4-pyrazolinylidene)-propylidene] - benzothiazoline (0.90 g.) and 1,3-propanesultone (1.0 g.) was heated at 170° for 1 hour. The product was dissolved in warm ethanol, the solution diluted with ether, and the solid which separated was collected and washed with ether. This material was refluxed for 5 minutes in ethanol (20 ml.) with 3-methyl-2-methylthiobenzothiazolium toluene-p-sulphonate (1.4 g.) and triethylamine (1.1 ml.). The dye which separated was collected and washed with hot ethanol and was finally boiled out repeatedly with methanol when it was obtained as green crystals, M.P. 364–365° (decomp.).

The dye extends the sensitivity of a silver iodobromide photographic emulsion to 6750 A. with a maximum at 6500 A.

*Example 30.—Anhydro-(3 - methyl-2-benzothiazole)(6-methoxy - 3 - methyl-2-benzothiazole)β-[3-methyl-2-(1-methyl-4-sulphobutyl)-5-oxo-1-phenyl - 4 - pyrazolinyl]-trimethincyanine hydroxide*

A mixture of 3-methyl-2-[2-(3-methyl-5-oxo-1-phenyl-4-pyrazolinylidene)-propylidene]-benzothiazoline (2.0 g.) and 1,4-pentanesultone (4.5 g.) was heated at 170° for 3 hours. The cooled melt was dissolved in warm methanol, and ether was added to precipitate a sticky solid. This material and 6-methoxy-3-methyl-2-methylthiobenzothiazolium toluene-p-sulphonate (2.1 g.) were refluxed in ethanol (25 ml.) with triethylamine (1.5 ml.) for 1 hour. The cooled solution was filtered from a little unreacted merocyanine, and the filtrate was diluted with water. The solid which separated was collected, washed with water, dried and extracted with benzene (Soxhlet). The residue was crystallised from ethanol to yield the dye. M.P. 251–254° (decomp.).

The dye extends the sensitivity of a silver iodobromide photographic emulsion to 6650 A. with a maximum at 6300 A.

In a manner similar to Examples 29 and 30, 3-methyl-2 - [2 - (3 - methyl-5-oxo-1-phenyl-4-pyrazolinylidene)-propylidene]-benzothiazoline was fused with 1,3-propanesultone (1 hour at 170°), or with 1,4-butane sultone (4 hours at 170°); the products were reacted with 3-methyl-2 - methylthiobenzothiazolium toluene-p-sulphonates in ethanol and triethylamine to yield the dyes of Examples 31 to 38 (Table 3). All of these dyes possess the structure:

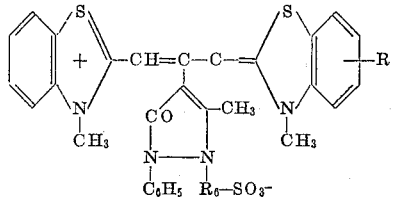

TABLE 3

| Example | Substituents R in one benzothiazole ring | $R_6$ | Solvent for crystallisation | M.P., °C. | Sensitising, A. Extent | Sensitising, A. Max. |
|---|---|---|---|---|---|---|
| 31 | 6-Cl | -(CH₂)₃- | Methanol | 339–341 (decomp.) | 6,650 | 6,350 |
| 32 | 6-Cl | -(CH₂)₄- | do | 318–320 (decomp.) | 6,550 | 6,300 |
| 33 | 6-OCH₃ | -(CH₂)₃- | do | 285–287 (decomp.) | 6,700 | 6,400 |
| 34 | 6-OCH₃ | -(CH₂)₄- | do | 248–251 | 6,500 | 6,200 |
| 35 | 5,6-(OCH₃)₂ | -(CH₂)₃- | do.¹ | 308–310 (decomp.) | 6,900 | 6,700 |
| 36 | 5,6-(OCH₃)₂ | -(CH₂)₄- | Ethanol | 276–279 (decomp.) | 6,550 | 6,200 |
| 37 | 6-O.CH₂.CH₂.OCH₃ | -(CH₂)₃- | Methanol | 265–268 | 6,600 | 6,300 |
| 38 | 6-O.CH₂.CH₂.OCH₃ | -(CH₂)₄- | do | 229–231 | 6,600 | 6,250 |

¹ Boiled out.

The following intermediates of Formula IV were used similarly for the preparation of dyes:

A. 6 - chloro - 3 - methyl-2-[2-(3-methyl-5-oxo-1-phenyl - 4 - pyrazolinylidene)-propylidene]-benzothiazoline.

B. 6 - methoxy - 3 - methyl-2-[2-(3-methyl-5-oxo-1-phenyl - 4 - pyrazolinylidene)-propylidene]-benzothiazoline.

C. 3,5,6 - trimethyl-2-[2-(3-methyl-5-oxo-1-phenyl-4-pyrazolinylidene)-propylidene]-benzothiazoline.

D. 3 - methyl - 6 - phenyl-2-[2-(3-methyl-5-oxo-1-phenyl - 4 - pyrazolinylidene)-propylidene]-benzothiazoline.

E. 3 - methyl - 2 - [2 - (3-methyl-5-oxo-1-phenyl-4-pyrazolinylidene) - propylidene]-naptho[1,2d]thiazoline.

F. 2 - [2-(1-m-chlorophenyl-3-methyl-5-oxo-4-pyrazolinylidene)-propylidene]-3-methylbenzothiazoline.

G. 3 - methyl - 2 - [2-(3-methyl-5-oxo-1-p-tolyl-4-pyrazolinylidene)-propylidene]-benzothiazoline.

H. 2 - [2 - (1 - benzyl-3-methyl-5-oxo-4-pyrazolinylidene)-propylidene]-3-methylbenzothiazoline.

I. 3 - methyl - 2 - [2 - (1-methyl-5-oxo-3-phenyl-4-pyrazolinylidene)-propylidene]-benzothiazoline.

J. 2 - [2 - (3,2' - furyl-5-oxo-1-phenyl-4-pyrazolinylidene)-propylidene]-3-methylbenzothiazoline.

In each case, one of the above intermediates was fused with either 1,3-propanesultone or 1,4-butanesultone at temperatures ranging from 130 to 180°, and the resulting quaternary salt was reacted with a 2-methylthiobenzothiazole methotoluene-p-sulphonate in ethanol containing triethylamine. In this manner, the dyes of Examples 39 to 66 were prepared, all of which possessed the structure:

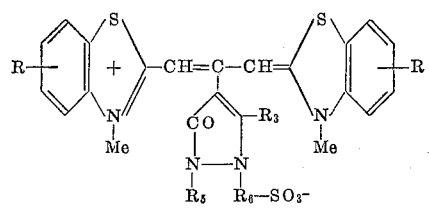

In the following Table 4, the letter following the example number indicates the merocyanine used.

TABLE 4

| Example | Substituents R in the benzothiazole rings | | $R_3$ | $R_5$ | $R_6$ | Solvent for crystallisation | M.P., °C. | Sensitising, A. | |
|---|---|---|---|---|---|---|---|---|---|
| | | | | | | | | Extent | Max. |
| 39 A | 6—Cl | 6—Cl | —CH₃ | —C₆H₅ | —(CH₂)₃— | Methanol | 336–337 (decomp.) | 6,550 | 6,350 |
| 40 A | 6—Cl | 6—OCH₃ | —CH₃ | —C₆H₅ | —(CH₂)₃— | do.¹ | 325–327 (decomp.) | 6,650 | 6,350 |
| 41 A | 6—Cl | 5,6—(OCH₃)₂ | —CH₃ | —C₆H₅ | —(CH₂)₃— | do.¹ | 263–266 | 6,750 | 6,500 |
| 42 B | 6—(OCH₃) | 6—Cl | —CH₃ | —C₆H₅ | —(CH₂)₄— | Ethanol | 312 | 6,550 | 6,200 |
| 43 B | 6—(OCH₃) | 6—(OCH₃) | —CH₃ | —C₆H₅ | —(CH₂)₃— | Methanol | 236–237 (decomp.) | 6,800 | 6,500 |
| 44 B | 6—(OCH₃) | 6—(OCH₃) | —CH₃ | —C₆H₅ | —(CH₂)₄— | do | 348 | 6,700 | 6,400 |
| 45 B | 6—(OCH₃) | 5,6—(OCH₃)₂ | —CH₃ | —C₆H₅ | —(CH₂)₄— | Ethanol | 248–250 | 6,650 | 6,250 |
| 46 C | 5,6—(CH₃)₂ | 6—(OCH₃) | —CH₃ | —C₆H₅ | —(CH₂)₃— | Methanol¹ | 318–320 (decomp.) | 6,700 | 6,400 |
| 47 C | 5,6—(CH₃)₂ | 6—(OCH₃) | —CH₃ | —C₆H₅ | —(CH₂)₄— | do | 294–296 | 6,650 | 6,350 |
| 48 C | 5,6—(CH₃)₂ | 5,6—(OCH₃)₂ | —CH₃ | —C₆H₅ | —(CH₂)₃— | do | 271–272 | 6,850 | {6,200 6,700} |
| 49 C | 5,6—(CH₃)₂ | 5,6—(OCH₃)₂ | —CH₃ | —C₆H₅ | —(CH₂)₄— | do | 276–278 | 6,800 | 6,400 |
| 50 D | 6—C₆H₅ | 6—OCH₃ | —CH₃ | —C₆H₅ | —(CH₂)₃— | do.¹ | 292 (decomp.) | 6,600 | 6,200 |
| 51 D | 6—C₆H₅ | 5,6—(OCH₃)₂ | —CH₃ | —C₆H₅ | —(CH₂)₃— | do | 305–307 (decomp.) | 6,850 | 6,400 |
| 52 D | 6—C₆H₅ | 6—C₆H₅ | —CH₃ | —C₆H₅ | —(CH₂)₃— | do.¹ | 298 (decomp.) | 6,750 | 6,300 |
| 53 E | 4,5—benzo | | —CH₃ | —C₆H₅ | —(CH₂)₃— | do | >340 | 6,900 | 6,650 |
| 54 E | 4,5—benzo | 6—OCH₃ | —CH₃ | —C₆H₅ | —(CH₂)₃— | do.¹ | 303–304 (decomp.) | 6,900 | 6,650 |
| 55 F | | 6—OCH₃ | —CH₃ | m-chlorophenyl | —(CH₂)₃— | do | 284–286 (decomp.) | 6,700 | 6,400 |
| 56 G | | 6—OCH₃ | —CH₃ | p-tolyl | —(CH₂)₃— | do | >330 | 6,650 | 6,400 |
| 57 G | | 5,6—(OCH₃)₂ | —CH₃ | do | —(CH₂)₃— | do | 300–304 (decomp.) | 6,800 | 6,550 |
| 58 H | | 6—OCH₃ | —CH₃ | Benzyl | —(CH₂)₃— | do | 300 (decomp.) | 6,650 | 6,350 |
| 59 H | | 5,6—(OCH₃)₂ | —CH₃ | do | —(CH₂)₃— | do | 310–313 (decomp.) | 6,850 | 6,650 |
| 60 I | | 6—OCH₃ | —C₆H₅ | —CH₃ | —(CH₂)₃— | do | 215–218 | 6,600 | 6,250 |
| 61 I | | 5,6—(OCH₃)₂ | —C₆H₅ | —CH₃ | —(CH₂)₃— | do | 287–290 | 6,650 | 6,300 |
| 62 J | | 6—Cl | 2-furyl | —C₆H₅ | —(CH₂)₄— | do | 312–314 (decomp.) | 6,450 | 6,250 |
| 63 J | | 6—OCH₃ | do | —C₆H₅ | —(CH₂)₃— | do.¹ | 318–320 | 6,700 | 6,400 |
| 64 J | | 6—OCH₃ | do | —C₆H₅ | —(CH₂)₄— | do | 275 (decomp.) | 6,650 | 6,400 |
| 65 J | | 5,6—(OCH₃)₂ | do | —C₆H₅ | —(CH₂)₃— | do | 296–298 | 6,800 | 6,550 |
| 66 J | | 5,6—(OCH₃)₂ | do | —C₆H₅ | —(CH₂)₄— | do | 308–310 (decomp.) | 6,800 | 6,550 |

¹ Boiled out.

*Example 67.—Anhydro-bis-(3-methyl-2-benzothiazole)β-(p-methoxyphenyl-5-oxo-1-phenyl - 2-3' - sulphopropyl-4-pyrazolinyl)-trimethincyanine hydroxide*

A mixture of 3-methyl-2[2-(3-p-methoxyphenyl-5-oxo-1-phenyl-4-pyrazolinylidene)-propylidene]benzothiazoline (1.25 g.) and 1,3-propanesultone (3.0 g.) was heated at 160° for 4 hours. A solution of the resulting melt in ethanol was treated with ether, and the tar which separated was washed several times with ether. This product was refluxed in ethanol (20 ml.) with 3-methyl-2-methylthiobenzothiazolium toluene-p-sulphonate (1.5 g.) and anhydrous sodium acetate (0.8 g.) for 45 minutes. The solid which separated was collected and washed successively with ethanol, water and ethanol. After crystallisation from methanol, the dye had M.P. 283–287°.

The dye extends the sensitivity of a silver iodobromide photographic emulsion to 6450 A. with a maximum at 6200 A.

Similarly prepared was:

*Example 68.—Anhydro - (3 - methyl-2-benzothiazole)(6-methoxy-3-methyl-2-benzothiazole)β-(3 - p - methoxyphenyl-5-oxo-1-phenyl-2-3' - sulphopropyl - 4 - pyrazoinyl)-trimethincyanine hydroxide*

The dye had M.P. 261–263° after crystallisation from methanol. It extends the sensitivity of a silver iodobromide photographic emulsion to 6500 A. with a maximum at 6350 A.

*Example 69.—Anhydro-(3-methyl-4,5-diphenyl - 2 - thiazole)(3-methyl-2-benzothiazole)β-(3-methyl - 5 - oxo-1 - phenyl-2-3'-sulphopropyl-4-pyrazolinyl)-trimethincyanine hydroxide*

A mixture of 3-methyl-2-[2-(3-methyl-5-oxo-1-phenyl-4-pyrazolinylidene)propylidene] - 4,5 - diphenylthiazoline (1.4 g.) and 1,3-propanesultone (1.75 g.) was heated at 145° for 2½ hours. A solution of the resulting melt in ethanol was treated with ether, and the tar which separated was washed several times by decantation with ether. A solution of the product in ethanol (15 ml.) was refluxed for 30 minutes with 3-methyl-2-methylthiobenzothiazolium toluene-p-sulphonate (1.3 g.) and triethylamine (0.6 ml.). The dye which separated was collected and crystallised from methanol, when it had M.P. 320–323° (decomp.).

The dye extends the sensitivity of a silver iodobromide photographic emulsion to 6550 A. with a maximum at 6200 A.

Similarly prepared were the following Examples 70 to 72:

*Example 70.—Anhydro - (3 - methyl-4,5-diphenyl-2-thiazole)(6-methoxy-3 - methyl - 2 - benzothiazole)β - (3-methyl-5-oxo-1-phenyl - 2 - 3' - sulphopropyl-4-pyrazolinyl)-trimethincyanine hydroxide*

The dye was crystallised from methanol, and had M.P. 283–284°. It extends the sensitivity of a silver iodobromide photographic emulsion to 6650 A. with a maximum at 6200 A.

*Example 71.—Anhydro-(3 - methyl - 4,5 - diphenyl-2-thiazole)(5,6 - dimethoxy-3-methyl-2-benzothiazole)β-(3-methyl-5-oxo-1-phenyl - 2 - 3' - sulphopropyl-4-pyrazolinyl)-trimethincyanine hydroxide*

The dye had M.P. 329–331° after crystallisation from methanol. It extends the sensitivity of a silver iodobromide photographic emulsion to 6800 A. with a maximum at 6500 A.

*Example 72.—Anhydro-bis-(3-methyl - 4,5 - diphenyl - 2-thiazole)β - (3 - methyl-5-oxo-1-phenyl-2-3'-sulphopropyl-4-pyrazolinyl)-trimethincyanine hydroxide*

The dye was crystallised from ethanol, and had M.P. 320–322°. It extends the sensitivity of a silver iodobromide photographic emulsion to 6650 A. with a maximum at 6300 A.

*Example 73.—Anhydro-(3-methyl-$\Delta^2$ - thiazoline-2)(6-methoxy-3-methyl-2-benzothiazole)$\beta$ - (3 - methyl-5-oxo - 1 - phenyl-2-3'-sulphopropyl-4-pyrazolinyl) - trimethincyanine hydroxide*

A mixture of 3-methyl-2-[2-(3-methyl-5-oxo-1-phenyl-4-pyrazolinylidene)-propylidene] - thiazolidine (2.0 g.) and 1,3-propanesultone (6.0 g.) was fused at 140° for 5 hours. The resulting melt was dissolved in ethanol and ether was added to the solution. The tar which separated was washed several times with ether. A solution of this product in ethanol (20 ml.) was refluxed for 30 minutes with 6 - methoxy - 3-methyl-2-methylthiobenzothiazolium toluene-p-sulphonate (2.4 g.) and triethylamine (1.0 ml.). The dye which separated was collected and crystallised from methanol, when it had M.P. 323–325° (decomp.).

The dye extends the sensitivity of a silver iodobromide photographic emulsion to 5750 A. with a maximum at 5500 A.

*Example 74.—Anhydro - (3,5 - dimethyl-2-benzoselenazole)(6 - methoxy - 3 - methyl-2-benzothiazole)$\beta$-(3-methyl - 5 - oxo-1-phenyl-2-3'-sulphopropyl-4-pyrazolinyl)-trimethincyanine hydroxide*

The dye was prepared as in Example 73 from 3,5-dimethyl-2-[2-(3-methyl-5-oxo-1-phenyl - 4 - pyrazolinylidene) propylidene]-benzoselenazoline, and after crystallisation from methanol had M.P. 305–307°.

The dye extends the sensitivity of a silver iodobromide photographic emulsion to 6800 A. with a maximum at 6550 A.

*Example 75.—Anhydro - (3 - methyl-2-benzothiazole)(6-methoxy-3-methyl-2-benzothiazole)$\alpha$ - methyl - $\beta$ - (3-methyl - 5 - oxo - 1-phenyl-2-3'-sulphopropyl-4-pyrazolinyl)-trimethincyanine hydroxide*

The method of Example 73 was followed, using 3-methyl-2-[1-methyl-2-(3-methyl-5-oxo-1-phenyl - 4-pyrazolinylidene)-propylidene] - benzothiazoline, and the dye had M.P. 190–193° after crystallisation from a mixture of ethanol and ethyl acetate.

The dye extends the sensitivity of a silver iodobromide photographic emulsion to 6550 A. with a maximum at 6350 A.

*Example 76.—Anhydro - (3 - methyl-2-benzothiazole)(1-methyl - 2 - quinoline)$\beta$-(3-methyl-5-oxo-1-phenyl-2-3' - sulphopropyl-4-pyrazolinyl) - trimethincyanine hydroxide*

A mixture of 3-methyl-2-[2-(3-methyl-5-oxo-1-phenyl-4-pyrazolinylidene)-propylidene]-benzothiazoline (0.7 g.) and 1,3-propanesultone (0.8 g.) was heated for 1 hour at 170°. A solution of the melt in ethanol was treated with ether, and the solid which separated was collected and washed with ether. This product and 1-methyl-2-methylthioquinolinium toluene - p - sulphonate (1.15 g.) were refluxed in ethanol (15 ml.) containing triethylamine (0.9 ml.) for 15 minutes. The solid which separated on cooling was collected and boiled out with methanol to give the dye, M.P. 322–323° (decomp.).

The dye extends the sensitivity of a silver iodobromide photographic emulsion to 7350 A. with a maximum at 7100 A.

*Example 77.—Anhydro - (6 - methoxy-3-methyl-2-benzoxazole)(3,6 - dimethyl - 2 - benzoxazole)$\beta$-(3-methyl-5 - oxo - 1 - phenyl-2-3'-sulphopropyl-4-pyrazolinyl)-trimethincyanine hydroxide*

A mixture of 6-methoxy - 3 - methyl-2-[2-(3-methyl-5-oxo-1-phenyl - 4 - pyrazolinylidene) - propylidene]-benzoxazoline (1.8 g.), 3,6-dimethyl-2-thiobenzoxazoline (1.8 g.), and 1,3-propanesultone (6 g.) was heated at 160° for 4 hours. Pyridine (15 ml.) was added, the mixture was refluxed for 1 hour, and was treated with cold water. The solid was collected, washed with hot water, dried, and crystallised from methanol, yielding the dye, M.P. 315–318° (decomp.).

The dye extends the sensitivity of a silver iodobromide photographic emulsion to 6000 A. with a maximum at 5750 A.

*Example 78.—Anhydro - (6-methoxy - 3 - methyl - 2-benzoxazole)(3,5,6 - trimethyl - 2 - benzoxazole)$\beta$-(3-methyl - 5 - oxo - 1 - phenyl - 2 - 3' - sulphoropyl - 4-pyrazolinyl) trimethincyanine hydroxide*

The dye was prepared as in Example 77, using 3,5,6-trimethyl-2-thiobenzoxazoline, and had M.P. 298–301° (decomp.) after boiling out with methanol.

The dye extends the sensitivity of a silver iodobromide photographic emulsion to 6000 A. with a maximum at 5700 A.

*Example 79.—Anhydro - bis - (3 - ethyl - 2 - benzoxazole)$\beta$ - (3 - methyl - 5 - oxo - 1 - phenyl - 2 - 3' - sulphopropyl-4-pyrazolinyl) - trimethincyanine hydroxide*

A mixture of 4 - isopropylidene-3-methyl-1-phenyl-5-pyrazolone (0.65 g.), 3-ethyl-2-thiobenzoxazoline (2.5 g.), and 1,3-propanesultone (6.0 g.) was fused at 160° for 6 hours, and the melt was then refluxed with pyridine (20 ml.) for 1 hour. The mixture was diluted with water, and the solution was extracted with chloroform. Evaporation of the dried extract gave the dye, which had M.P. 317° (decomp.) after crystallisation from ethanol.

The dye extends the sensitivity of a silver iodobromide photographic emulsion to 5450 A. with a maximum at 5200 A.

*Example 80.—Anhydro - (3 - methyl - 2 - benzothiazole) (3,6 - dimethyl - 2 - benzoaxazole)$\beta$ - (3 - methyl - 5-oxo - 1 - phenyl - 2 - 3' - sulphopropyl - 4 - pyrazolinyl)-trimethincyanine hydroxide*

A mixture of 3,6 - dimethyl-2-[2-(3-methyl-5-oxo-1-phenyl-4-pyrazolinylidene)-propylidene] - benzoxazoline (0.9 g.), 3-methyl-2-thiobenzothiazoline (0.9 g.), and 1,3-propanesultone (5.0 g.) was heated at 150° for 2 hours. The mixture was refluxed with pyridine (20 ml.) for 1 hour, and then treated with dilute aqueous ammonia. The solid was collected, washed with hot water and benzene, and crystallised from methanol to give the dye, M.P. >330°.

The dye extends the sensitivity of a silver iodobromide photographic emulsion to 6350 A. with a maximum at 6000 A.

*Example 81.—Anhydro (6 - methoxy - 3 - methyl - 2-benzothiazole)(6 - methoxy - 3-methyl-2-benzoaxazole) $\beta$ - (3 - methyl - 5 - oxo - 1 - phenyl - 2 - 3' - sulphopropyl - 4 - pyrazolinyl) - trimethincyanine hydroxide*

A mixture of 6-methoxy-3-methyl-2-[2-(3-methyl-5-oxo-1-phenyl-4-pyrazolinylidene) - propylidene] - benzoxazoline (0.9 g.) and 1,3-propanesultone (2.0 g.) was heated at 140° for 40 minutes. The product and 6-methoxy-3-methyl - 2 - methylthiobenzothiazolium toluene - p-sulphonate (2.0 g.) were refluxed in pyridine (10 ml.) for 45 minutes, and the resulting mixture was treated with water. The solid was collected and washed successively with hot water and boiling benzene, and crystallised from ethanol to give the dye, M.P. 240–242° (decomp.).

The dye extends the sensitivity of a silver iodobromide photographic emulsoin to 6400 A. with a maximum at 6150 A.

*Example 82.—Anhydro - (5,6 - dimethoxy - 3 - methyl-2 - benzothiazole)(6 - methoxy - 3 - methyl - 2 - benzoxazole)$\beta$ - (3 - methyl - 5 - oxo - 1 - phenyl - 2 - 3'-sulphopropyl - 4 - pyrazolinyl) - trimethincyanine hydroxide*

The dye was prepared from 5,6-dimethoxy-3-methyl-2-methylthiobenzothiazolium toluene-p-sulphonate, as in Example 81, and had M.P. 170–172° after crystallisation from ethanol.

The dye extends the sensitivity of a silver iodobromide photographic emulsion to 6450 A. with a maximum at 5900 A.

*Example 83.*—Anhydro - (3 - methyl - 2 - benzothiazole)(6 - methoxy - 3 - methyl - 2 - benzothiazole)β- [3 - methyl - 1 - (6 - methyl - 2 - pyridyl) - 5 - oxo-2 - 3' - sulphopropyl - 4 - pyrazolinyl] - trimethincyanine hydroxide A mixture of 3-methyl-2-[2-(3-methyl-1-(6-methyl-2-pyridyl)-5-oxo-4-pyrazolinylidene) propylidene] - benzothiazoline (1.0 g.) and 1,3-propanesultone (3.0 g.) was heated at 145° for 2 hours. The resulting melt was washed repeatedly with dry ether, and the residue was refluxed for 1 hour in ethanol (25 ml.) with 6-methoxy-3-methyl-2-methylthiobenzothiazolium toluene - p - sulphonate (1.5 g.) and triethylamine (1.0 ml.). The solid which separated was collected and crystallised from methanol to give the dye, M.P. 275–278°.

The dye imparts a new band of sensitivity to a silver iodobromide photographic emulsion from 5700 to 6100 A. with a maximum at 5950 A.

*Example 84.*—Anhydro - bis - (3 - methyl - 2 - benzothiazole)β - (3 - methyl - 5 - oxo - 1 - phenyl - 2 - 3' - sulphopropyl - 4 pyrazolinyl) - pentamethincyanine hydroxide A mixture of 3-methyl-2-[2-(3-methyl-5-oxo-1-phenyl-4-pyrazolinylidene)-propylidene]-bezothiazoline (1.0 g.) and 1,3-propanesultone (1.1 g.) was fused at 170° for 1 hour. A solution of the melt in ethanol was diluted with ether, and the solid which separated was collected and washed with ether. This product and 2-ω-ethylthiovinyl-3-methylbenzothiazolium toluene-p-sulphonate (1.0 g.) were refluxed in ethanol (20 ml.) and thiethylamine (0.8 ml.) for 15 minutes. The dye which separated on cooling was collected and boiled out with methanol, when it had M.P. 239–240° (decomp.).

The dye imparts a new band of sensitivity to a silver iodobromide photograph emulsion from 6800 to 8500 A. with maxima at 7200 and 8350 A.

*Example 85.*—Anhydro - (3 - methyl - 2 - benzothiazole) (5,6 - dimethoxy - 3 - methyl - 2 - benzothiazole)β- (3 - methyl - 5 - oxo - 1 - phenyl - 2 - 3' - sulphopropyl-4-pyrazolinyl) pentamethincyanine hydroxide The dye was prepared as in Example 84, and had M.P. 239—240° after boiling out with methanol.

The dye imparts a new band of sensitivity to a silver iodobromide photographic emulsion from 6800 to 7900 A. with a maximum at 7600 A.

*Example 86.*—Anhydro - (3 - methyl - 2 - benzothiazole)(1,3,3 - trimethyl - 2 - indole)β - (3 - methyl-5 - oxo - 1 - phenyl - 2 - 3' - sulphopropyl - 4 - pyrazolinyl)-trimethincyanine hydroxide 3-methyl-2-[2-(3-methyl - 5 - oxo - 1 - phenyl - 4 - pyrazolinylidene)-propylidene] - benzothiazoline was quaternized with 1,3-propanesultone as in Example 84, and the product was refluxed in pyridine (10 ml.) with 2-ω-acetanilidovinyl - 1,3,3 - trimethylindolium iodide (3.2 g.) and piperidine (1.0 ml.) for 20 minutes. The solution was diluted with water, and the tar which separated was washed successively with water, ethyl acetate, and ethanol, when it hardened. Crystallisation from methanol gave the dye, M.P. 294–295° (decomp.).

In order to demonstrate that the presence of the alkylthio group in dyes of the present invention causes a valuable increase in speed compared to the dyes of British patent specification No. 544,645, the following dyes have been comparatively tested:

K. (6 - methoxy - 3 - methyl - 2 - benzothiazole)(3-methyl - 2 - benzothiazole)β-(3-2'-furyl-2-methyl-5-oxo-1-phenyl-4-pyrazolinyl)-trimethincyanine bromide.

L. Anhydro - (6 - methoxy-3-methyl-2-benzothiazole) (3 - methyl - 2 - benzothiazole)β - (3-2'-furyl-5-oxo-1-phenyl-2-3'-sulphopropyl-4 - pryazolinyl) - trimethincyanine hydroxide (Example 63).

M. Anhydro - (6 - methoxy-3-methyl-2-benzothiazole) (3 - methyl-2-benzothiazole)β-(3-2'-furyl-5-oxo-1-phenyl-2-3'-sulphobutyl-4-pyrazolinyl)-trimethincyanine hydroxide (Example 64).

N. (6-methoxy - 3 - methyl-2-benzothiazole)(3-methyl-2 - benzothiazole)β - (1 - m - chlorophenyl-2,3-dimethyl-5-oxo-4-pyrazolinyl)-trimethincyanine bromide.

O. Anhydro-(6 - methoxy - 3 - methyl-2-benzothiazole) (3 - methyl - 2 - benzothiazole)β - (1-m-chlorophenyl-3-methyl - 5 - oxo - 2 - 3' - sulphopropyl-4-pyrazolinyl)-trimethincyanine hydroxide (Example 55).

P. (6 - methoxy - 3 - methyl-2-benzothiazole)(3-methyl-2 - benzothiazole)β - (2,3-dimethyl-5-oxo-1-p-tolyl-4-pyrazolinyl)-trimethincyanine bromide.

Q. Anhydro-(6 - methoxy - 3 - methyl-2-benzothiazole) (3 - methyl - 2 - benzothiazole)β-(3-methyl-5-oxo-2-3'-sulphopropyl - 1 - p - tolyl - 4 - pyrazolinyl)-trimethincyanine hydroxide (Example 56).

R. Bis-(3,6-dimethyl - 2 - benzoxazole)β-(2,3-dimethyl-5-oxo - 1 - phenyl-4-pyrazolinyl)-trimethincyanine iodide.

S. Anhydro - bis - (3,6 - dimethyl-2-benzoxazole)β-(3-methyl-5-oxo-1-phenyl - 2,3'-sulphopropyl-4-pyrazolinyl)-trimethincyanine hydroxide (Example 6).

T. Bis - (3,5,6-trimethyl - 2 - benzoxazole)β-(2,3-dimethyl - 5 - oxo-1-phenyl-4-pyrazolinyl)-trimethincyanine iodide.

U. Anhydro - bis - (3,5,6 - trimethyl-2-benzoxazole)β- (3 - methyl - 5 - oxo - 1 - phenyl - 2 - 3' - sulphopropyl-4-pyrazolinyl)-trimethincyanine hydroxide (Example 2).

V. Bis - (3,6 - dimethyl - 2 - benzoxazole)β - (2,3-dimethyl-5 - oxo - 4 - isoxazolinyl)-trimethincyanine iodide.

W. Anhydro - bis - (3,6 - dimethyl-2-benzoxazole)β-(3-methyl - 5 - oxo - 2 - 3' - sulphopropyl-4-isoxazolinyl)-trimethincyanine hydroxide (Example 21).

Each of the above dyes was incorporated in a fast silver iodobromide photographic emulsion at a concentration of 0.067 g. per g. mol. of silver halide. The relative log speed of each dyed emulsion was measured, speed being defined as the minimum exposure required to produce a density of 0.1 above fog of the exposed and developed emulsion; larger values of this speed correspond to faster emulsions. Two values of the speed were obtained for each emulsion, one for an exposure through a filter transmitting between 3700 and 5100 A. with a maximum transmission at 4300 A., the other for an exposure through a filter transmitting freely above 5300 A. The latter value provides a measure of the colour sensitivity of the dyed emulsion.

| Dye | Speed to filter transmitting between 3,700 and 5,100 A. | Speed to filter transmitting above 5,300 A. |
|---|---|---|
| K | 3.67 | 3.78 |
| L | 3.83 | 4.11 |
| M | 3.80 | 4.00 |
| N | 3.78 | 3.51 |
| O | 3.90 | 4.18 |
| P | 3.65 | 3.86 |
| Q | 3.85 | 4.08 |
| R | 3.83 | 3.97 |
| S | 3.97 | 4.07 |
| T | 3.71 | 3.80 |
| U | 3.86 | 4.10 |
| V | 3.80 | 3.63 |
| W | 3.90 | 4.05 |

I claim as my invention:

1. A cyanine dye selected from the class consisting of dyes of the formula:

$$N^+=(CH-CH)_{n_1}=\overset{R_4}{\overset{|}{C}}-C=C-CH=(CH-CH)_m=\overset{}{C}-(CH-CH)_{n_2}-N$$

with $D_1$, $D_2$, $R_1$, $R_2$, $R_3$, and $O-C$, $C-R_3$, $A-N-R_5SO_3'$ wherein $R_1$ and $R_2$ are each alkyl lower groups, $R_3$ is selected from the class consisting of hydrogen and lower alkyl, phenyl and naphthyl or phenyl and naphthyl substituted by alkyl, amino, hydroxy, alkoxy and oxyalkyl groups or halogen atoms, and benzyl or naphthylmethyl, and furyl or pyridyl groups, $R_4$ is selected from the class consisting of hydrogen and alkyl groups, $R_6$ is selected from the class consisting of straight and branched chain saturated divalent alkylene groups of from 2 to 6 carbon atoms, A is selected from the class consisting of oxygen and —$NR_5$ wherein $R_5$ is selected from the class consisting of hydrogen and lower alkyl, phenyl and naphthyl or phenyl and naphthyl substituted by alkyl, amino, hydroxy, alkoxy and oxyalkyl groups or halogen atoms, and benzyl or naphthylmethyl, and furyl or pyridyl groups, $D_1$ and $D_2$ complete ring systems selected from the class consisting of benzothiazole, benzoxazole, benzoselenazole, thiazole, thiazoline, quinoline and indole, and $n_1$, $n_2$ and $m$ are each selected from nought and one.

2. A cyanine dye according to claim 1 wherein $D_1$ and $D_2$ each complete benzothiazole ring systems.

3. A cyanine dye according to claim 1 wherein $D_1$ and $D_2$ each complete benzoxazole ring systems.

4. Anhydro - bis - (3,5,6 - trimethyl - 2 - benzoxazole) β-(3-methyl - 5 - oxo - 1 - phenyl-2-3′-sulphopropyl-4-pyrazolinyl)-trimethincyanine hydroxide.

5. Anhydro - bis - (6 - methoxy - 3 - methyl-2-benzoxazole)β - (3 - methyl - 5 - oxo-2-3′-sulphopropyl-4-isoxazolinyl)-trimethincyanine hydroxide.

6. Anhydro-(3 - methyl - 2 - benzothiazole)(6-methoxy-3 - methyl - 2 - benzothiazole)β-(3-methyl-5-oxo-1-phenyl 2-3′-sulphopropyl - 4 - pyrazolinyl) - trimethincyanine hydroxide.

7. Anhydro - bis - (6 - methoxy - 3 - methyl-2-benzothiazole)β - (3 - methyl - 5 - oxo - 1 - phenyl-2-4′-sulphobutyl-4-pyrazolinyl)-trimethincyanine hydroxide.

8. Anhydro-(3-methyl - 2 - benzothiazole)(6-methoxy-3 - methyl - 2 - benzothiazole)β-(3-methyl-5-oxo-2-3′-sulphopropyl - 1 - p - tolyl - 4 - pyrazolinyl)-trimethincyanine hydroxide.

References Cited

UNITED STATES PATENTS

| 2,895,955 | 7/1959 | Haseltine et al. | 260—240.5 |
| 2,984,664 | 5/1961 | Fry et al. | 260—240.5 |
| 2,304,981 | 12/1942 | Wilmanns | 96—106 |
| 2,870,014 | 1/1959 | Brooker et al. | 96—106 |

FOREIGN PATENTS

| 544,645 | 4/1942 | Great Britain. |
| 742,112 | 12/1955 | Great Britain. |
| 944,301 | 12/1963 | Great Britain. |

JOHN D. RANDOLPH, *Primary Examiner.*

N. G. TORCHIN, *Examiner.*

J. T. BROWN, *Assistant Examiner.*